June 2, 1936.  R. N. S. MERRITT  2,043,184
ABRASIVE SAW TOOTH
Filed April 23, 1935
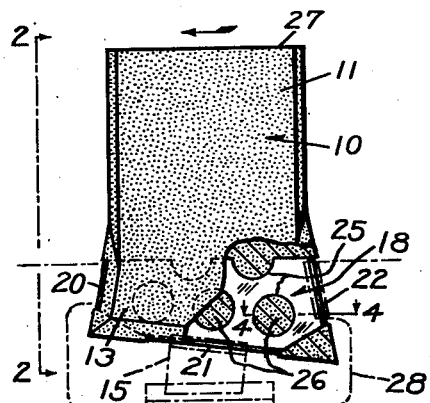
Fig.7
Fig.1
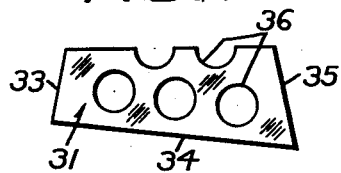
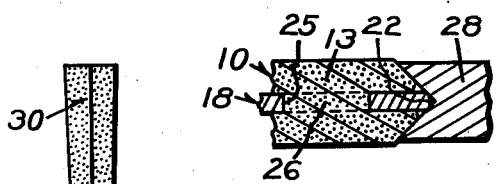
Fig.4
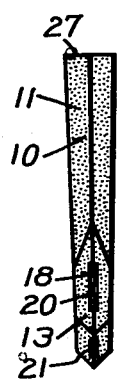
Fig.2
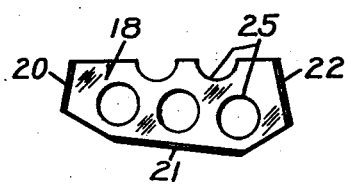
Fig.6
Fig.3
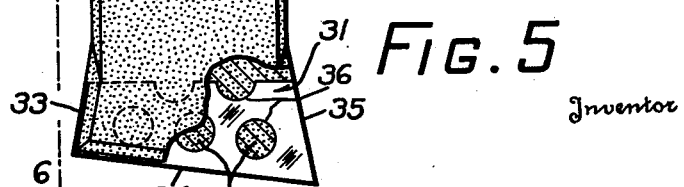
Fig.5
Inventor
RALPH N. S. MERRITT
WITNESSES
Franklin E. Johnson
W R Greenwood
By Clayton L. Jenks
Attorney Patented June 2, 1936

2,043,184

UNITED STATES PATENT OFFICE 2,043,184

ABRASIVE SAW TOOTH

Ralph N. S. Merritt, Worcester, Mass., assignor to Norton Company, Worcester, Mass., a corporation of Massachusetts Application April 23, 1935, Serial No. 17,827

1 Claim. (Cl. 125—22)

This invention relates to saw teeth, and more particularly to an improved abrasive saw tooth which is adapted to be detachably mounted and secured in a saw blade of either the circular or reciprocable type for cutting stone and other hard materials.

One common type of abrasive saw tooth ordinarily utilized for stone sawing operations has comprised a solid body of bonded abrasive granules having a base or shank portion suitably shaped for mounting the tooth on the saw blade. In such a tooth construction, the lower side and bottom edges of the base portion of the tooth are ordinarily formed with double beveled surfaces which are adapted to frictionally contact with and fit suitable V-shaped grooves in the side walls of the saw blade socket and the adjacent edge of the respective wedge member therein employed when the tooth is held in position on the saw blade. While the prior teeth of this type may be serviceable for sawing purposes, it will be seen that it is not highly desirable to utilize a saw tooth which has abrasive throughout the mounting portions of its base since it will wear down the cooperating tooth supporting elements on the saw blade. Hence, the walls of the saw blade sockets and the grooved seating surface of the wedge member respectively, which fit against the adjacent edges of the tooth which are formed of metal, tend to wear rapidly and irregularly by the abrasions of the abrasive of the shank portion of the tooth incident to frequent replacements or tightening of the saw teeth in the sockets and so produce rough, uneven surfaces on the respective tooth engaging elements which is likely to result in an unsafe or bad seating of the teeth in the sockets.

As a consequence, it has been the practice heretofore to rebuild and reshape the walls of the badly worn sockets with material welded thereon in order to produce a proper fitting of the teeth in the sockets. In many cases of excessive wear, the user has also been furnished with a complete set of new wedges with each set of replacement saw teeth so that the new teeth could be more firmly tightened in the saw sockets.

Furthermore, it is found in practice, however, that many operators of stone sawing machinery would pound the bottom edge of the tooth shank with heavy metal objects so as to hammer the tooth in position and tighten it in its socket with excessive force so that serious damage is caused to the tooth due to breakage of the edge portions of the tooth under the heavy pounding action as well as detrimental injury to the bearing surfaces of the saw socket.

It is accordingly an object of this invention to overcome these objectionable features and to provide an insertable abrasive saw tooth having a plurality of non-abrasive mounting surfaces on its base portion which will serve to continually present non-abrasive qualities thereto and which may be detachably mounted in the socket of a saw blade without danger of causing detrimental abrasion and wear on the tooth engaging portions on the socket elements during repeated use and replacement therein.

With this and other objects in view, as will be apparent from the following disclosure, the invention resides in the construction of a saw tooth as set forth in the specification and covered by the claim appended hereto.

Referring to the drawing, in which like reference numerals indicate like parts:

Fig. 1 is a fragmentary side elevation, partly broken away, of one form of abrasive saw tooth embodying my invention and showing in dot-and-dash outline one well-known method of mounting the tooth;

Fig. 2 is an end elevational view, taken on the line 2—2 of Fig. 1;

Fig. 3 is a detail in side elevation of the non-abrasive insert element shown in Fig. 1;

Fig. 4 is a detail in cross-section, taken on the line 4—4 of Fig. 1;

Fig. 5 is a fragmentary side elevation, partly broken away, of a modified form of my invention;

Fig. 6 is an end elevation of the tooth shown in Fig. 5, taken on the line 6—6; and Fig. 7 is a detail view in side elevation of the modified form of non-abrasive insert element shown in Fig. 5.

In accordance with my invention, I provide a saw tooth which comprises a shaped, molded, unitary body of bonded abrasive grains having an abrasive shank or base portion and a plurality of non-abrasive surface portions united therewith which are adapted to fit and be held against suitable cooperating tooth supporting surfaces on the saw blade to form a rigid mounting and yet will not abrade or detrimentally wear the same. This may be accomplished by embedding a non-abrasive element, made preferably as a thin plate, in the central zone of the abrasive shank. This non-abrasive plate member, which is preferably made of metal such as sheet iron or steel although it may comprise a suitable molded rubber or resinoid body, may be of regular geometrical shape, such as a polygon or a trapezium, the essential feature being that portions of the embedded plate will be exposed at the edges of the shank section of the tooth in places of maximum wear so as to provide non-abrasive surfaces for holding the tooth on the support, and also to provide an edge construction which is so constructed that it cannot be easily damaged by any excessive force improperly applied thereto by the operator to tighten the tooth. To this end, I preferably make the insert element of a shape which will provide a body having a plurality of outer edges for mounting the tooth which conform substantially to the contour of the tooth shank. In practice, the plate is made of such a size that its side and bottom edges will not extend to any great extent beyond the abrasive material which forms the side and bottom edges of the tooth shank. In order to unite the non-abrasive plate member integrally with the shank of the saw tooth, the interior edge portion and the longitudinal side faces of the plate may be provided with suitable gripping means, such as openings through its body or surface indentations formed thereon wherein the saw tooth material may secure a firm grip on the member.

For the abrasive material to be used in making the saw tooth, I may utilize extremely hard abrasive materials, such as grains of crystalline alumina and silicon carbide, in the artificial and natural form, as well as other well-known abrasive materials, the grains being of suitable grit size and integrally united together by an organic bonding material, such as rubber, shellac or a resinoid, to form a desired grinding structure.

As one embodiment of my invention, I have shown in Figs. 1, 2, 3 and 4 a saw tooth construction comprising a molded abrasive body 10 composed of organic bonded abrasive grains, one end of said body providing an outer grinding portion 11 adapted to project outwardly from the peripheral edge of the usual saw blade, as indicated in dot-and-dash outline in Fig. 1, and its other end shaped to form an enlarged base or shank 13 which is adapted to be mounted on the saw blade. In using this type of saw tooth in practice, the saw blade is provided with a plurality of sockets formed in its outer peripheral edge in which a series of the saw teeth 10 are inserted and detachably mounted, the teeth being held firmly in position therein by means of binding contact of the side edges of the shank against the adjacent walls of the sockets and being maintained firmly in place therein by wedges 15 driven in tightly between the bottom of the socket and bottom edge of the tooth shank 13. The shank of the tooth 10 is formed with double beveled side and bottom edges, the former being adapted to fit into engagement with V-grooves in the walls of the socket and the seating surface of the wedge 15. Embedded in the base of the tooth and integrally united therewith is the non-abrasive element 18, which may comprise a plate member the plane section of which may be shaped as a polygon, as shown in Figs. 1 and 3 of the drawing. The plate 18 may be made of any suitable material, such as sheet metal, or it may consist of a molded body formed from plastic, heat-settable, organic materials including rubber and resinoids, such as a phenolic resinoid of the type known as bakelite. This plate when embedded in the body of the tooth shank, thus presents a plurality of exposed non-abrasive edges 20, 21 and 22 respectively, which may be composed of metal or of molded non-abrasive composition coextensive with the bounding edges of the shank to provide the necessary tooth holding portions for mounting the tooth in the saw blade. The body of the plate 15, as shown in Figs. 1 and 3, is perforated by holes 25 so that the molded composition will form a series of posts 26 f grally holding it to the shank.

As shown in Fig. 2, the grinding secti…, shaped to provide an outer plane pe. surface 27 which constitutes the cuttii of the tooth and comprises the maximur… ness of cross-section at this point. The tudinal side faces of the segment are fo… that they taper from this thick outer sawi… tion 27 to a narrower thickness at the bot… of the shank 13. The shank 13 is form… double-beveled side and bottom edges to fit into V-shaped grooves made in th… of the saw socket and in the upper edg… wedge 15 respectively, the insert plate … disposed in the central plane of the sh… and extending laterally thereof to pro… non-abrasive edges 20, 21 and 22 res… which thus serve to seat the tooth in blade 28, as shown diagrammatically i…

In Figs. 5, 6 and 7, there is shown a form of saw tooth construction embod… invention in which the tooth 30 has abrasive element or plate 31, in the fc… trapezium, which is embedded in the s… abrasive base section 32 of the tooth. tooth 30 comprises a molded body of bonded abrasive grains of elongated sha… ing an upper grinding section 33. W… non-abrasive element 31 is molded in the shank of the tooth, the side and edges 33, 34 and 35, respectively, of the pl… thus form a continuous non-abrasive surf tending circumferentially around the low… of the tooth base to provide a full the cooperating elements in the tooth thus avoiding any tendency of the tooth crumble or causing detrimental wear socket portions which would tend to i… bearing surfaces. A series of holes 36 formed in the body and on edge portion… plate to enable the molded tooth mat… form posts 37 and thus obtain a more fi… on the embedded insert member. As sh… Fig. 5, the dimensions of the plate are su… the edges 33, 34 and 35, respectively, project beyond the tooth periphery subs… ly more than the thickness of a single … grain of the grit side which is employe… respective tooth mixture, this amount be ficient to allow for the metal edges of t… to spread over the surface of the abrasi… terial of the tooth edges, due to its be… tended thereover by the pressure ca… tightening the tooth in its socket, thus ening the non-abrasive bearing surface tact with the socket.

In one method of making a saw tooth… cordance with my invention, a mixture pared of abrasive grains of suitable si… resinoid bonding material, in which the ents are thoroughly distributed through mass. A suitable composition which i… to be satisfactory may contain the ing in the proportions specified:

Per cent b…

Abrasive grains, 14 mesh and finer____
Resinoid bond (bakelite)_____

In order to make a tooth, the preshap… abrasive element is inserted into a mol… size and shape desired, the insert eleme… suitably located in the central plane of adapted to form the shank portion of t… A quantity of this prepared mixture suf… form the tooth is then packed into the mold around the insert member about which it is caused to embed the same by tamping or jolting. The whole tooth thus shaped may then be subjected to conditions of heat and pressure to consolidate the mass to the mold shape and obtain the complete tooth, all of which is standard in the art. If desired, the mixture may be molded in accordance with the standard cold molding procedure utilized in the grinding wheel art for the manufacture of resinoid bonded abrasive wheels, such as that set forth in the patents to Martin No. 1,626,246 of April 26, 1927, and Brock No. 1,537,454 of May 12, 1925. Suitable resinoid molding materials which are standard in the art may be employed for this purpose; however, it is preferred to employ either a synthetic condensation product belonging to the phenolic resinoid group, such as those known under the trade-marks "Bakelite", "Durez", "Redmanol" and the like, or it may comprise one of the phthalic glycerol type of resinoid, such as that known by the trade-mark "Glyptal". The resinoid material may be used either in the powdered or liquid condition or as a combination of both, depending upon the particular molding requirements to be employed.

In making a rubber bonded saw tooth, a mixture of suitable composition may be prepared of abrasive grains of suitable size, rubber, a vulcanizing agent, such as sulfur, together with suitable fillers, the proportions of these ingredients being well-known and standard in the grinding wheel art. This mixture is rolled out into sheets of convenient thickness and cut into the desired tooth shape by means of dies, as is well known to those skilled in the manufacture of rubber bonded abrasive articles. In order to make a tooth, the insert body is first positioned in the center of the shank section of the mold, after which one or more strips of the rubber blanks thus cut to the tooth shape are placed in the mold face to face with flat sides of the insert body so that the latter is thus interposed between the two layers of the rubber compound. The whole mass is then molded to shape by hydraulic pressure, after which the molded body may then be subjected to a vulcanization treatment, as is standard in the art wherein the bond may be cured to the hardness and rigidity required.

It will be apparent from this improved saw tooth construction, since the non-abrasive edge surfaces of the tooth shank are always held up against the tooth engaging surfaces of the saw blade socket elements, that any wear in these portions by abrasive material will be eliminated and thus avoid any tendency to injure the saw blade members by contact with the tooth material.

While I have specifically described the use of my invention as adapted to the manufacture of a saw tooth of a phenolic resinoid composition, it will be obvious to those skilled in the art that other resinoid and organic materials and proportions may also be used to suit the particular requirements desired. Such modifications or substitutions of my invention are, however, to be considered as embodied in the above specification and in the following claim.

Having thus described my invention, what I claim as new and desire to secure by Letters Patent is:

An abrasive saw tooth comprising a molded body of abrasive grains and an organic bond having a base portion adapted for mounting in a support with a grinding portion projecting therefrom, and a thin non-abrasive insert embedded centrally and longitudinally within the tooth, which has faces exposed at the bottom and the sides of the base portion but substantially coextensive with the surface thereof, so that the surfaces of the base portion comprise a central non-abrasive portion flanked by abrasive on each side thereof, whereby said surfaces may serve for mounting the tooth on a support, without tending to abrade the same.

RALPH N. S. MERRITT.